United States Patent [19]

Kim

[11] 3,718,422

[45] Feb. 27, 1973

[54] PHOTOFLASH FIRING CIRCUITS EMPLOYING SERIES RESISTOR-DIODE COMBINATIONS

[75] Inventor: Sang-Chul Kim, Cleveland Heights, Ohio

[73] Assignee: General Electric Company, Schnectady, N.Y.

[22] Filed: Sept. 28, 1971

[21] Appl. No.: 184,463

[52] U.S. Cl. ....................................431/95, 307/317

[51] Int. Cl. ...............................................F21k 5/02

[58] Field of Search ......................................307/317; 431/93–95, 95 A, 98; 240/1.3

[56] References Cited

UNITED STATES PATENTS

| | | | |
|---|---|---|---|
| 3,518,487 | 6/1970 | Tanaka et al. | 431/95 X |
| 3,676,046 | 7/1972 | Laskowski | 431/95 |
| 3,532,931 | 10/1970 | Cote et al. | 431/95 |

OTHER PUBLICATIONS

Industrial Photography – July 1961, pages 15,52

*Primary Examiner*—Carroll B. Dority, Jr.
*Attorney*—Norman C. Fulmer et al.

[57] ABSTRACT

A plurality of series resistor-diode combinations are successively connected in series between a plurality of photoflash lamps, so as to connect the flash lamps into an electrical parallel circuit through the resistor-diode combinations. An end of the parallel circuit is adapted to be connected across a source of firing pulses. Each successive firing pulse will flash a different lamp. In a further embodiment, additional resistors are connected between the aforesaid end of the circuit and the respective resistor-diode combinations.

14 Claims, 4 Drawing Figures

Inventor:
Sang-Chul Kim
by Norman C. Fulmer
His Attorney

PHOTOFLASH FIRING CIRCUITS EMPLOYING SERIES RESISTOR-DIODE COMBINATIONS

CROSS-REFERENCES TO RELATED APPLICATIONS

Ser. No. 29,547, filed Apr. 17, 1970, Edward J. Laskowski, "DIODE CIRCUIT FOR SEQUENTIALLY FLASHING PHOTOFLASH LAMPS."

Ser. No. 39,418, filed May 21, 1970 and now U.S. Pat. No. 3,619,715, San-Chul Kim, "RESISTOR CIRCUIT FOR SEQUENTIALLY FLASHING PHOTOFLASH LAMPS."

Ser. No. 184,445, filed concurrently herewith, Sang-Chul Kim, "PHOTOFLASH FIRING CIRCUIT EMPLOYING PARALLEL RESISTOR-DIODE COMBINATIONS," all of the foregoing applications being assigned to the same assignee as the present patent application.

BACKGROUND OF THE INVENTION

The invention is in the field of electronic circuitry for sequentially flashing photoflash lamps and is particularly useful with a unitary array of flash lamps, such as three or four or more lamps arranged to radiate their light in the same direction when they are sequentially flashed, so that the array need not be moved nor removed until all of its lamps have been flashed.

Numerous circuits have been devised for sequentially flashing photoflash lamps by pulses of electrical energy such as are obtained from a battery through a momentarily closed switch or from a capacitor which has been charged through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to successively different flashbulbs; another type of circuit utilizes heat-responsive or light-responsive means associated with the flash lamps and adapted to actuate switching means for connecting the pulse source to successively different flash lamps as each lamp becomes flashed; and a further type of circuit utilizes transistors or thyristors for automatically connecting the pulse source to successively different flash lamps as each lamp becomes flashed.

Another previously proposed circuit employs resistors successively connected in series with a plurality of individual flash lamps, so that the lamps are connected in electrical parallel through the resistors. The firing pulse source is connected to an end of the circuit, whereby each flash lamp is connected across the pulse source through successively greater resistance. The first pulse flashes the nearest lamp, which becomes an open circuit upon flashing, whereupon the next pulse flashes the next lamp, etc. It is difficult, however, to select resistance values of the series resistors such that the circuit will flash the first lamp without also undesirably flashing the next lamp, while also insuring that, when all lamps but the last have been flashed, the circuit will apply enough of the firing pulse energy through the series resistors to reliably cause the last lamp to flash.

The above-referenced Laskowski patent application discloses a circuit in which diodes are successively connected in series between photoflash lamps. The above-referenced Kim U.S. Pat. application, Ser. No. 39,418, discloses a circuit having resistors successively connected in series between photoflash lamps, and additional resistors connected between points of at least some of the series resistors. The above-referenced Kim concurrently filed patent application discloses a circuit having parallel-connected diode-resistor combinations connected successively in series between photoflash lamps.

SUMMARY OF THE INVENTION

Objects of the invention are to provide an improved circuit for sequentially flashing flash lamps, and to provide such a circuit that is low in cost and highly reliable in operation.

The invention comprises, briefly and in a preferred embodiment, a plurality of photoflash lamps intended to be sequentially flashed by a sequential series of firing voltage pulses, a plurality of series resistor-diode combinations successively connected between the lamps so as to connect the lamps into an electrical parallel circuit through the resistor-diode combinations, and means adapted for connecting an end of the parallel circuit across a source of firing pulses. In a further embodiment, one or more additional resistors are connected between said end of the parallel circuit and the respective junctions of the resistor and diode of each of said resistor-diode combinations. The diodes in the circuit are connected so as to be forward-biased by the polarity of the firing pulses. In one embodiment the diode of each resistor-diode combination is connected relatively nearer to the source of firing pulses, and in another embodiment the resistor of each resistor-diode combination is connected relatively nearer to the source of firing pulses.

DESCRIPTION OF THE PREFERRED EMBODIMENTS

Figure 1:
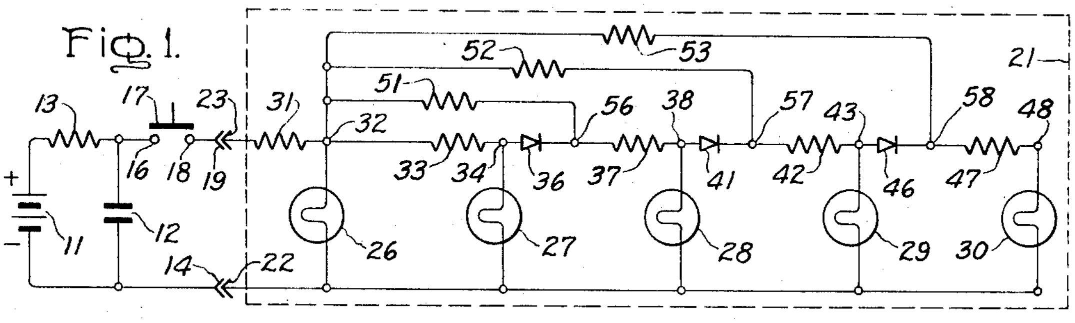
FIG. 1 is an electrical schematic diagram of a preferred embodiment of the invention, in which the series resistors and diodes are arranged in a certain order, and in which shunting resistors are included.

In the circuit of FIG. 1, a battery 11 is connected to charge a capacitor 12 through a resistor 13. In a preferred arrangement, the battery 11 has a voltage of 9 volts, the capacitor 12 has a capacitance of 1,000 microfarads, and the resistor 13 has a resistance of 1,000 ohms. One terminal of the capacitor 12 is connected to a connector plug terminal 14, and the other terminal of capacitor 12 is connected to a terminal 16 of a switch 17, the other terminal 18 thereof being connected to a connector plug terminal 19. The switch 17 is adapted to be momentarily closed in synchronization with the opening of a camera shutter, in well-known manner. The circuitry thus far described functions as a source of electrical energy pulses for flashing photoflash lamps, and may be incorporated in a camera, or in a flash attachment for use with a camera. Although the firing pulse is sometimes called a "voltage" pulse, it is primarily the energy of the pulse, comprising the combination of voltage, current, and time duration, that causes a lamp to flash.

A flash lamp array unit 21 is provided with a pair of connector prongs 22 and 23 adapted for electrical engagement with the terminals 14 and 19, respectively. The unit 21 contains a plurality of photoflash lamps 26–30 which may be of conventional type such as General Electric type AG-1, each containing a filament provided with electrical connection lead wires and adapted for initiating a flash of combustible material contained within the bulb. One end of the filament of each of the lamps 26–30 is connected to the connector prong 22. The other ends of the filaments of lamps 26–30 are successively connected, through an arrangement of resistors and diodes, to the connector prong 23. More specifically, a resistor 31 is connected between the connector prong 23 and the lead wire terminal 32 of lamp 26, a resistor 33 is connected between the first lamp lead wire terminal 32 and the lead wire terminal 34 of lamp 27, a diode 36 and a resistor 37 are series connected in the named order between the lead wire terminal 34 of lamp 27 and lead wire terminal 38 of lamp 28, a diode 41 and a resistor 42 are connected in series in the named order between the lead wire terminal 38 and lead wire terminal 43 of lamp 29, and a diode 46 and a resistor 47 are connected in series in the named order between the lead wire terminal 43 and the lead wire terminal 48 of lamp 30. Each of the diodes 36, 41, and 46 is connected in the circuit so as to be forward biased by the polarity of firing pulses provided by the charge on the capacitor 12. Thus, series resistor-diode combinations are successively connected between at least some of the flash lamps.

Additional resistors 51, 52, and 53 are connected between the flash lamp terminal 32 and, respectively, the junction 56 of diode 36 and resistor 37, junction 57 of diode 41 and resistor 42, and junction 58 of diode 46 and resistor 47.

Preferably the lamps 26–30 of the array 21 are provided with individual reflectors arranged to radiate the light emitted therefrom in the same direction. If desired, another combination of lamps and resistor-diode series circuits may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from the single unit. Other connector prongs similar to 22 and 23 can be provided for connecting the rear array of lamp circuitry to the connectors 14 and 19 when the unit is turned around for flashing the second array of lamps. If desired, the flash array unit 21 may be removed from the camera or flash adaptor after some of its lamps have been flashed, and reinserted at a later time for flashing the remaining lamps. After the lamps have been flashed, the array unit 21 may be discarded.

The circuit of FIG. 1 functions as follows. Upon a momentary closing of the switch 17, in synchronization with the opening of a camera shutter, the electrical energy stored in the capacitor 12 (40 millijoules for a 1,000 microfarad capacitor charged to 9 volts) discharges into the circuit of the lamp unit 21, in the form of a electrical pulse having an approximately exponential decay characteristic. Most of the capacitor's electrical energy discharges through the filament of the first lamp 26, and a small portion of the pulse energy flows through the filaments of the remaining lamps 27–30 via the series connected resistors and diodes. At the same time, some of the firing pulse energy flows through resistor 51 and hence through the circuitry to the right of the junction 56 (the diode 36 prevents current from flowing backwardly and through the second lamp 27); some of the pulse energy flows through resistor 52 and hence through the circuitry to the right of junction 57 (the diode 41 prevents current from flowing backwardly and through the filament of lamp 28); and some of the pulse energy flows through resistor 53 and hence through the filament of the last lamp 30 (the diode 46 prevents current from flowing backwardly and hence through the filament of lamp 29). All of the aforesaid currents flow through a return path provided via the connectors 14 and 22. The purpose of these current drain-offs is to reduce the firing pulse energy when the first lamp is flashed, to insure that the second lamp 27 will not also flash.

While the major portion of electrical energy of the firing pulse from capacitor 12 is flowing through the filament of the first lamp 26, the filament resistance (which initially is about 0.6 ohms for a typical flash lamp) increases as the filament becomes incandescent, and the filament burns out and becomes an open circuit as the lamp flashes. The moment at which the lamp 26 flashes and its filament becomes an open circuit, is a critical moment at which the next lamp 27 is most likely to undesirably flash, because when the filament of lamp 26 becomes an open circuit the remaining energy in capacitor 12 is available to flow through filaments of the remaining lamps. However, at this moment the energy remaining in capacitor 12 has been reduced, due to the pulse energy used in flashing the first lamp 26 and also due to portions of the firing pulse energy being drained off through the circuitry as described above, to a value such that it cannot cause the second lamp 27 to undesirably flash.

Upon the next momentary closing of the switch 17, in synchronization with the opening of the camera shutter, most of the electrical pulse energy from capacitor 12 flows through the filament of the second flash lamp 27, since the first lamp 26 now is an open circuit. The energy discharged through the lamp 27 is reduced slightly by the voltage drops across the resistors 31 and 33, and also is reduced somewhat by portions of the pulse energy flowing through the resistors 51, 52, and 53 to the remainder of the circuit as has been described above in connection with firing of the first lamp 26; however, the major portion of the firing pulse energy which flows through the second lamp 27 is adequate for causing the lamp to reliably flash. When the third lamp 28 is flashed, the firing pulse energy supplied to it is reduced slightly by voltage drops across resistors 31, 33, and 37, and by a slight voltage drop (0.6 volts, for example) across the diode 36; however, the resistor 51 now is in shunt with resistor 33 and diode 36, and therefore some of the firing pulse energy flows through resistor 51 to the junction 56, and hence through resistor 37 and the filament of lamp 28, whereby the lamp 28 receives a greater amount of firing pulse energy than it would in the absence of the resistor 51. During the application of a firing pulse to the third lamp 28, the resistors 52 and 53 function to drain a slight amount of firing pulse energy into the remaining part of the circuitry. When the fourth lamp 29 is flashed, resistors 51 and 52 are both in shunt with portions of the series resistor-diode combinations preceding the fourth lamp 29, so that a relatively large amount of the firing pulse energy is applied to the filament of lamp 29, causing it to flash. When the fifth lamp 30 is flashed, all three of the resistors 51, 52, and 53 are in shunt with portions of the resistor-diode combinations, whereby the fifth lamp 30 receives a major portion of the firing pulse voltage thus causing it to reliably flash.

The circuit advantageously supplies approximately equal firing pulse energies to each of the lamps when flashed, this amount of firing pulse energy being considerably higher than the amount or portions of pulse energy simultaneously applied to the remaining unflashed lamps in the circuit. This is achieved by the fact that the resistors 51, 52, and 53 function to drain off some of the firing pulse energy when the earlier lamps in the circuit are flashed, and these same resistors function to increase the relative amount of firing pulse energy applied to the later lamps in the circuit when they are flashed, thus functioning to equalize the amount of firing pulse energy applied to each lamp in turn as it is flashed.

The diodes 36, 41 and 46 improve the circuit performance in at least two ways. First, they block the flow of firing pulse current backwardly through an earlier lamp; more specifically, when the first lamp 26 is being flashed, the second lamp 27 is the one that is most likely to become undesirably flashed; however, the diode 36 prevents any of the drained off firing pulse current flowing through resistor 51 from flowing backwardly in the circuit through the filament of the second lamp 27. The remaining diodes function similarly. A second advantage achieved by the diodes 36, 41 and 46, is that they provide a shorter and improved time constant of the circuitry when the later lamps are being flashed, so that each lamp flashes quickly and reliably. The shorter time constant is obtained by the fact that the values of the resistors 37, 42 and 47 may be made smaller due to the diodes 36, 41 and 46 being in the circuit. A certain amount of resistance is desirable, however, between each successive lamp, so that when a lamp is being fired there will be a certain amount of circuit time constant between the lamp being flashed and the next lamp, so that the lamp being flashed receives its portion of the firing pulse relatively more quickly than does the next succeeding lamp in the circuit.

In a preferred embodiment of the circuit of FIG. 1, the flash lamps 26–30 each comprises a General Electric type AG-1 flash lamp having a cold filament resistance of 0.6 ohms, each of the diodes 36, 41 and 46 may be a General Electric silicon diode type 1N5060, or a stack of diodes, and the resistors may have the following values:

Resistor 13 – 1000 ohms
Resistor 31 – 3.4 ohms
Resistor 33 – 2.0 ohms
Resistor 37 – 1.8 ohms
Resistor 42 – 5.0 ohms
Resistor 47 – 2.8 ohms
Resistor 51 – 16.0 ohms
Resistor 52 – 2.4 ohms
Resistor 53 – 23 ohms The circuit possesses the desirable advantages of each of the above-referenced Laskowski diode circuit and Kim resistor circuit patent applications, plus the additional advantages described above of the diodes providing, in combination with the resistors, a shorter firing pulse time constant discharge circuit and a more uniformly distributed drain-off of excess firing pulse energy when the earlier lamps are being flashed, resulting in more reliable flashing of a single lamp per firing pulse.

Figure 2:
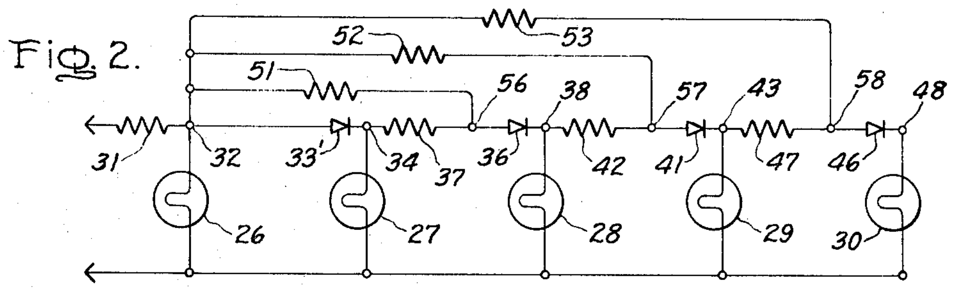
FIG. 2 is an electrical schematic diagram of an alternative embodiment of the invention, and is generally the same as FIG. 1 except that the order of the series resistors and diodes is reversed.

The circuit of FIG. 2 is similar to that of FIG. 1, except that the resistor and diode in each series resistor diode combination are reversed in position, and a diode 33′ is connected between the first and second lamp lead terminals 32 and 34, instead of a resistor 33 as in FIG. 1. The circuit of FIG. 2 functions similar to that described above for FIG. 1. FIG. 2 has the advantage of a shorter time constant for flashing the later lamps in the circuit, since there are more diodes and fewer resistors in the circuit of FIG. 2 than in the circuit of FIG. 1. However, the circuit of FIG. 1 provides a more desirable distribution of excess firing pulse energy when the first lamp 26 is being flashed, due to the diode 36 in FIG. 1 being positioned to prevent backward flow of excess firing pulse current through the second lamp 27 via resistor 51. In some circuit designs it may be desirable to employ both a resistor 33 and a diode 33′ in series between the first and second lamp lead to terminals 32 and 34. Also, the circuits can be designed with the far ends of the shunt resistors 51, 52 and 53 connected to taps on the series combination resistors 37, 42 and 47, or, alternatively, the far ends of the shunt resistors 51, 52 and 53 can be connected to junctions between series combination diodes in the series resistor-diode combination between each of the flash lamps, in the event a stack of multiple diodes is employed.

Figure 3:
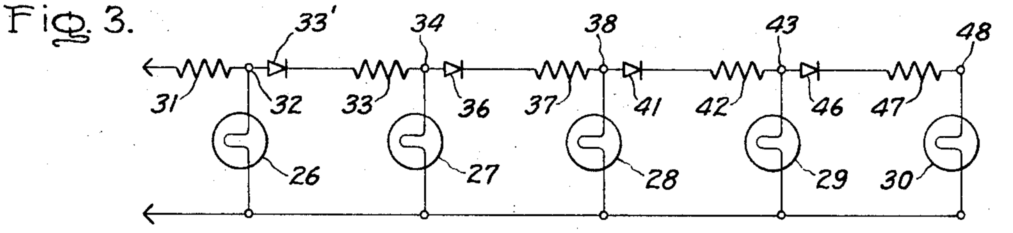
FIG. 3 is an electrical schematic diagram of a simplified embodiment of the invention, and is generally similar to FIG. 1 except that the shunting resistors are omitted.
Figure 4:
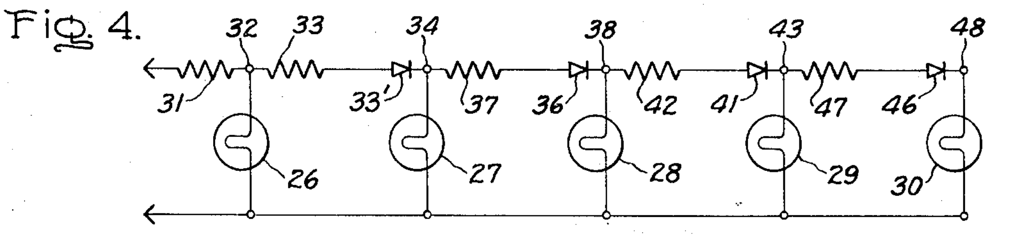
FIG. 4 is an electrical schematic diagram of a simplified embodiment of the invention, generally similar to FIG. 2 except that the shunting resistors are omitted.

FIGS. 3 and 4 are circuit diagrams similar to FIGS. 1 and 2, respectively, but with the shunting resistors 51, 52 and 53 omitted; also, a series combination of a resistor 33 and diode 33′ is provided between the first and second lamp lead terminals 32 and 34. The circuits function similarly to the circuits of FIGS. 1 and 2, but without the advantage of equalization of firing pulse energy applied to the successive lamps as is achieved by the shunting resistors 51, 52 and 53 in FIGS. 1 and 2. The circuits of FIGS. 3 and 4, by their series resistor-diode combinations, provide optimum time constants between the lamps so that each firing pulse will fire a single lamp. This time constant is sufficiently large so that the lamp being flashed will consume most of the firing pulse energy before any substantial amount of the firing pulse energy can build up, via a series resistor-diode combination, at the next lamp. At the same time, the time constants are sufficiently low so that, when the last lamp is flashed, it will receive a sufficiently fast-rising pulse of energy to insure reliable flashing.

The first series resistor 31 in the circuits helps to reduce the firing pulse energy applied to the first lamp 26, thus reducing the likelihood of the second lamp 27 undesirably flashing due to the excess firing pulse energy remaining after the first lamp flashes, but could be omitted if desired. Although the series resistor-diode combinations are shown in the "upper" branch of the circuit, some or all of them may be connected in the "lower" branch.

The circuitry of the invention can be incorporated into a camera or flash adaptor instead of in a disposable flash array, with the requisite number of electrical connectors being provided for connecting the filament lead wire terminals 32, 34, etc., of the array respectively to the different connection terminal points of the circuit.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A circuit for causing a plurality of photoflash lamps to be flashed sequentially by sequential firing energy pulses of given electrical polarity, said circuit comprising a plurality of pairs of terminal points adapted for electrical connection thereto of respective individual lamps of said plurality of flash lamps, and connection means successively connected between said pairs of terminal points to connect said pairs of terminal points into an electrical parallel circuit through said connection means, a first pair of said terminal points at one end of said parallel circuit being adapted for connection to a source of said firing pulses, wherein the improvement comprises a plurality of series resistor-diode combinations respectively constituting at least some of said connection means, said diodes being connected in the circuit so as to be forward-biased by said given polarity of the firing pulses.

2. A circuit as claimed in claim 1, including an additional resistor connected between a terminal point at said one end of the circuit and one of said series resistor-diode combinations.

3. A circuit as claimed in claim 2, in which said additional resistor is connected to the series resistor-diode combination at the junction of the resistor and diode thereof.

4. A circuit as claimed in claim 3, in which the resistor and diode of said one series resistor-diode combination are arranged with the resistor thereof relatively nearer to said one end of the circuit.

5. A circuit as claimed in claim 3, in which the resistor and diode of said one series resistor-diode combination are arranged with the diode thereof relatively nearer to said one end of the circuit.

6. A circuit as claimed in claim 1, including a plurality of additional resistors connected between a terminal point at said one end of the circuit and respectively different ones of said series resistor-diode combinations.

7. A circuit as claimed in claim 6, in which said additional resistors are connected to junctions of resistors and diodes in respectively different series resistor-diode combinations.

8. A circuit as claimed in claim 7, in which the resistor and diode of each series resistor-diode combination to which an additional resistor is connected are arranged with the resistor thereof relatively nearer to said one end of the circuit.

9. A circuit as claimed in claim 7, in which the resistor and diode of each series resistor-diode combination to which an additional resistor is connected are arranged with the diode thereof relatively nearer to said one end of the circuit.

10. A disposable unitary array of photoflash lamps including circuitry for causing said lamps to be flashed sequentially by sequential firing energy pulses of given electrical polarity, each of said lamps containing a filament for initiating flashing of the lamp and adapted to become an open circuit when said flashing occurs, connection means successively connected between said filaments of the lamps to connect said filaments into an electrical parallel circuit through said connection means, and means adapted to connect a first lamp filament at one end of said parallel circuit to a source of said firing pulses, wherein the improvement comprises a plurality of series resistor-diode combinations respectively constituting at least some of said connection means, said diodes being connected in the circuit so as to be forward-biased by said given polarity of the firing pulses.

11. An array as claimed in claim 10, including a plurality of additional resistors connected between said first lamp filament and respectively different ones of said series resistor-diode combinations.

12. An array as claimed in claim 11, in which said additional resistors are connected to junctions of resistors and diodes in respectively different series resistor-diode combinations.

13. An array as claimed in claim 12, in which the resistor and diode of each series resistor-diode combination to which an additional resistor is connected are arranged with the resistor thereof relatively nearer to said one end of the circuit.

14. An array as claimed in claim 12, in which the resistor and diode of each series resistor-diode combination to which an additional diode is connected are arranged with the diode thereof relatively nearer to said one end of the circuit.

* * * * *